(12) United States Patent
Cox et al.

(10) Patent No.: US 7,887,091 B1
(45) Date of Patent: Feb. 15, 2011

(54) ADDITIVES FOR LIQUID-COOLED INFLATORS

(75) Inventors: Matthew A. Cox, Centerville, UT (US); Bradley W. Smith, Plain City, UT (US); Robert D. Taylor, Hyrum, UT (US); Gary K. Lund, Malad City, ID (US); Michael P. Jordan, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/723,275

(22) Filed: Mar. 12, 2010

(51) Int. Cl.
B60R 21/26 (2006.01)
(52) U.S. Cl. .................. 280/741; 280/736; 280/737
(58) Field of Classification Search ............. 280/736, 280/737, 741
See application file for complete search history.

(56) References Cited

U.S. PATENT DOCUMENTS

| | | | |
|---|---|---|---|
| 3,810,655 A | 5/1974 | Prachar | |
| 3,813,007 A * | 5/1974 | Doin et al. | 222/4 |
| 5,669,631 A | 9/1997 | Johnson et al. | |
| 5,713,596 A * | 2/1998 | Messina et al. | 280/737 |
| 5,829,784 A * | 11/1998 | Brown et al. | 280/737 |
| 6,039,347 A | 3/2000 | Maynard | |
| 6,076,468 A * | 6/2000 | DiGiacomo et al. | 102/530 |
| 6,196,583 B1 | 3/2001 | Ruckdeschel et al. | |
| 6,412,814 B1 * | 7/2002 | Huber et al. | 280/736 |
| 6,616,183 B2 | 9/2003 | Huber et al. | |
| 7,770,924 B2 * | 8/2010 | Cox et al. | 280/741 |
| 2002/0158454 A1 * | 10/2002 | Huber et al. | 280/736 |
| 2010/0013201 A1 | 1/2010 | Cox et al. | |

OTHER PUBLICATIONS

Concurrently-filed U.S. Patent Application, Matthew A. Cox et al., filed Mar. 12, 2010, "Multi-Stage Inflator".

* cited by examiner

*Primary Examiner*—Toan C To
(74) *Attorney, Agent, or Firm*—Sally J Brown; Pauley Petersen & Erickson

(57) ABSTRACT

An inflator that includes a quantity of gas generant housed within a chamber. A liquid including at least one of a fuel soluble in the liquid or an oxidizer soluble in the liquid and a piston are housed within another chamber of the inflator. This chamber is sealed. Upon actuation, movement of the piston hydraulically expels the liquid through an opening in the piston such that the liquid contacts the gas formed by combustion of the gas generant and cools the same. The fuel and/or oxidizer in the liquid can react to form additional gas.

20 Claims, 8 Drawing Sheets

ADDITIVES FOR LIQUID-COOLED INFLATORS

BACKGROUND OF THE INVENTION

This invention relates generally to inflators for use in inflating inflatable restraint airbag cushions, such as used to provide impact protection to occupants of motor vehicles. More particularly, the invention relates to liquid-cooled inflators and the inclusion of performance enhancing additives therein.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

Pyrotechnic inflators also generally include a gas treatment element such as in the form of a filter. Such a filter form of gas treatment element may desirably serve to remove solids such as in the form of residual matter of the pyrotechnic gas generating material and such as may otherwise be entrained in the gas stream. Such a filter may also desirably serve to cool the gas formed by the combustion of a pyrotechnic gas generating material prior to the discharge of such gas from the inflator device. Filter elements, however, are often expensive and the inclusion thereof can add significantly to the cost and weight of an associated inflator device and inflatable restraint installation.

The automotive industry continues to demand inflatable restraint systems that are smaller, lighter, and less expensive to manufacture. As vehicles become smaller and more compact, corresponding changes to associated inflatable restraint systems are required in order to meet the constraints of these smaller vehicles.

An airbag inflator is a significant component of an inflatable restraint system. Accordingly, reducing the size, weight, and/or cost of an inflator can result in significant size, weight, and/or cost savings in the overall inflatable restraint system.

Thus, there is a need and demand for pyrotechnic-containing inflator devices and associated methods of operation such as to reduce or eliminate the need for the inclusion of filter elements. Further, there is a need and demand for such inflator devices and associated methods of operation that provide or result in improved or enhanced performance, such as in either or both increased gas output and gas output of reduced temperature.

SUMMARY OF THE INVENTION

The present invention provides improved inflator devices and associated or corresponding methods of operation.

In accordance with one aspect, there is provided an inflator that comprises a quantity of gas generant housed within a gas generant chamber. The gas generant chamber has a constant volume. The inflator also comprises an initiator to ignite the gas generant and form gas during deployment. A chamber is also provided to house a piston and a liquid, wherein the chamber is sealed by a burst disk or a seal, wherein during deployment the burst disk or seal is unsealed and the piston moves and hydraulically expels the liquid through an opening in the piston such that the liquid contacts and cools the gas formed by combustion of the gas generant. In some embodiments, the inflator may be fully or partially filterless. Other embodiments may be designed in which a diffuser is provided, the gas formed by combustion of the gas generant flows through the diffuser. In some embodiments, the burst disk will be ruptured whereas in other embodiments, the seal is press-fit against the chamber and this seal is unsealed by the movement of the piston.

In some embodiments, one or more baffles may be used. These baffles may be provided on the piston. In other embodiments, the gas formed by combustion of the gas generant and the liquid move into the interior of the piston, wherein an exit opening is provided to allow passage to the exterior of the piston. In some embodiments, the liquid hydraulically expelled through the opening vaporizes and mixes with the gas formed by combustion of the gas generant.

Additional embodiments may be constructed in which the gas formed by combustion of the gas generant flows through a tortuous path prior to exiting the inflator. This tortuous path may have right angle turn(s) for capturing particulates entrained in the gas. In further embodiments, as the gas flows through the tortuous path, any particulates entrained in the gas are removed from the gas and deposited within the inflator. The particulates may be deposited at a capture area.

Another aspect involves a method of cooling gas formed in an inflator may also be disclosed. In one such method, the inflator comprises a quantity of gas generant housed within a gas generant chamber, an initiator, and a piston chamber that houses a piston and a liquid. The method comprises the step of igniting the gas generant to form gas. An additional step of rupturing a burst disk used to seal the piston chamber is also performed. An additional step of moving the piston may also be performed. The movement of piston operates to hydraulically expel the liquid through an opening in the piston such that the liquid contacts and cools the gas formed by combustion of the gas generant.

In such embodiments, the inflators typically include a quantity of gas generant housed within a housing. The gas generant may be ignited to produce a quantity of inflation gas. This gas may then be channeled into an airbag to deploy the airbag. The inflator also includes gas flow openings in the housing. As will be explained herein, when the inflator is deployed, gas may flow out of the gas flow openings so that it may be channeled into the airbag.

The inflator further may comprise a piston that is housed within a chamber. (The chamber is within the housing). Also housed within the chamber is a quantity of liquid. The piston may also have an opening that is sealed by a burst disk. When the opening is sealed, the liquid cannot escape through the opening.

The combustion of the gas generant produces inflation gas that flows through the diffuser and contacts a piston that has been added to the inflator. This piston is housed within a chamber. When the gas enters this chamber, it pressurizes the chamber. At the same time, some of the gas may also begin to exit the inflator.

The chamber housing the piston also includes a quantity of liquid. When this chamber is pressurized by the influx of gas into the chamber, liquid begins to flow through an opening in the piston. This liquid will then mix with the gas.

When the liquid contacts the gas, at least some of the liquid is vaporized into a gas stream. Such vaporization process is endothermic and operates to cool the gas. Thus, by using a system that has evaporating liquid, the inflation gas may be cooled without the use of an expensive filter. Further, this vaporization of the liquid increases the amount of gas within the chamber. Thus, by using the liquid, the amount of gas generant necessary to produce sufficient inflation gas is reduced, further reducing the size and cost of the inflator.

Through the use of the liquid injection techniques described herein, the need to use a filter to cool the gas can be avoided or minimized. Further, the pressure required to inject the liquid into the gas stream can desirably be provided by the combustion gases of the inflator. In particular embodiments, particulate matter in the gas produced upon combustion of the gas generant may be removed without requiring the use of a filter. Specifically, at least part of the particulate removal function of the filter is accomplished by turning the gas flow significantly prior to exiting the inflator. The gas produced by vaporization or decomposition of the liquid contributes to the airbag inflation.

Those skilled in the art and guided by the teachings herein provided will understand and appreciate that the present embodiments do not necessarily have to be filterless. That is, if desired, a filter may also be used. However, the system may be "partially" filterless as the size and type of the filter needed may be reduced.

In one specific aspect, there is provided inflator that includes a housing defining a first chamber containing a quantity of gas generant. An initiator is operatively associated with the first chamber and is in reaction initiating communication with at least a portion of the quantity of gas generant. Upon actuation, the initiator acts or serves to ignite at least a portion of the quantity of gas generant to form gas. The housing further at least in part defines a second chamber adjacently disposed to the first chamber. The second chamber contains a quantity of liquid and a piston assembly. The liquid includes at least one of a fuel soluble in the liquid or an oxidizer soluble in the liquid. The piston assembly includes a piston having an interior sealed from the quantity of liquid, wherein during deployment, the piston moves to unseal the interior of the piston from the liquid to expel at least a portion of the quantity of liquid from the second chamber such that the expelled liquid contacts and cools gas formed by the ignition of the gas generant. The housing further has at least one discharge opening to permit gas to exit the housing.

In another specific aspect, there is provided an inflator that includes a housing at least in part defining a first chamber having a constant volume and containing a quantity of gas generant solid. An initiator is operatively associated with the first chamber in reaction initiating communication with at least a portion of the quantity of gas generant solid. Upon actuation, the initiator acts or serves to ignite the gas generant to form gas. The housing additionally at least in part defines a second chamber adjacently disposed to the first chamber. The second chamber contains a quantity of liquid and a piston assembly. The liquid desirably includes at least one soluble fuel and at least one soluble oxidizer that upon actuation are reactable to form additional gas. The piston assembly includes a piston having an interior sealed from the quantity of liquid. During deployment, the piston moves to unseal the interior of the piston from the liquid to hydraulically expel at least a portion of the quantity of liquid from the second chamber. The expelled liquid desirably contacts, vaporizes, mixes with and cools gas formed by the ignition of the gas generant and at least a portion of the at least one soluble fuel and at least one soluble oxidizer react to form additional gas. The housing further includes at least one discharge opening to permit gas to exit the housing.

In another aspect there is provided a method of cooling gas formed in an inflator. The inflator includes a housing at least in part defining a first chamber containing a quantity of gas generant, an initiator, with the housing further at least in part defining a second chamber adjacently disposed to the first chamber. The second chamber contains quantity of liquid and a piston assembly. The liquid includes at least one of a fuel soluble in the liquid or an oxidizer soluble in the liquid. In accordance with one embodiment, the method involves igniting the gas generant to form gas, unsealing an opening in the piston assembly that was used to seal the interior of the piston; and moving the piston to expel at least a portion of the quantity of liquid from the second chamber such that the expelled liquid contacts and cools gas formed by the ignition of the gas generant and the at least one of a fuel and an oxidizer soluble in the liquid reacts to form additional gas.

As used herein, references to a "liquid" are to be understood as encompassing fluid materials such as may suitably flow under conditions of operation.

As used herein, references to a specific composition, component, material or the like as "fuel-rich" or as a "fuel" are to be understood to refer to such composition, component, material or the like which generally lacks sufficient oxygen to burn completely to $CO_2$, $H_2O$ and $N_2$.

Correspondingly, references herein to a specific composition, component, material or the like as "fuel-deficient" or as an "oxidizer" are to be understood to refer to such composition, component, material or the like which generally has more than sufficient oxygen to burn completely to $CO_2$, $H_2O$ and $N_2$.

Other objects and advantages will be apparent to those skilled in the art from the following detailed description taken in conjunction with the appended claims and drawings.

DETAILED DESCRIPTION OF THE INVENTION

As described in greater detail below, the present invention provides an improved inflator device and associated or corresponding methods of operation.

Figure 1:
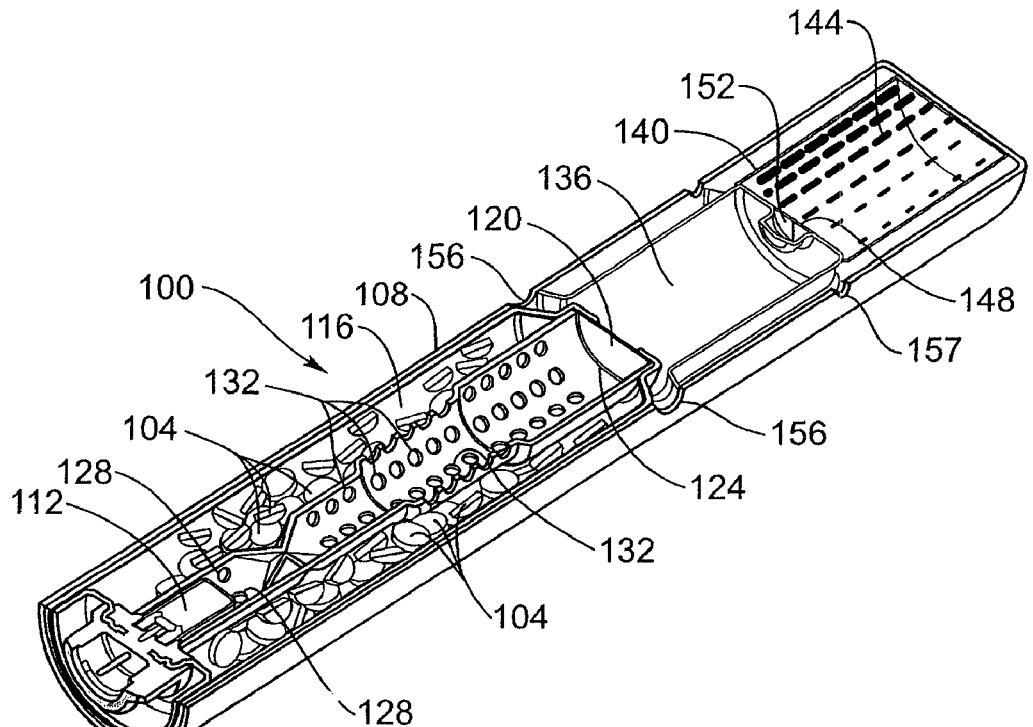
FIG. 1 is a sectional view of an embodiment of an inflator, the inflator being shown prior to deployment.

FIG. 1 illustrates an inflator device in accordance with a one embodiment of the invention and generally designated with the reference numeral 100. The inflator 100 includes a quantity of gas generant 104 contained within a housing 108. The inflator 100 also includes an initiator 112. The initiator 112 is used to ignite the gas generant 104. When the gas generant 104 is ignited, a quantity of inflation gas is formed. This gas may then be channeled into an airbag (not shown) to deploy the airbag. Those skilled in the art will appreciate that initiators and gas generants are known in the art and that a variety of different features may be used for these components.

The gas generant 104 is housed within a chamber 116 that is sealed by a burst disk 120. The chamber 116 is sometimes referred to as a "gas generant chamber." The gas generant chamber 116 has a constant volume. Before, during, and after deployment of the inflator, the volume of the gas generant chamber 116 remains the same. A diffuser 124 is also positioned in the chamber 116. Specifically, when activated, the initiator 112 produces ignition products such as including hot gas that flows through the holes 128. This hot gas contacts and ignites the gas generant 104. In turn, the ignition of the gas generant 104 creates a supply of gas that passes through the holes 132 to the interior of the diffuser 124 and then contacts the burst disk 120. The increase in pressure within the chamber 116 caused by ignition of the gas generant 104 will rupture the burst disk 120 and allow the gas to exit the chamber 116.

Referring still to FIG. 1, the inflator 100 further comprises a piston 136 that is housed within a chamber 140. (The chamber 140 is within the housing 108). Also housed within the chamber 140 is a quantity of liquid 144. The piston 136 may also have an opening 148 that is sealed by a burst disk 152. When the opening 148 is sealed, the liquid 144 cannot escape through the opening 148.

The liquid 144 can be any liquid that remains a liquid between −40° C. and 90° C. In some embodiments, the liquid 144 can be any liquid that remains a liquid between −35° C. and 85° C. The liquid must also be capable of vaporizing endothermically and, when vaporized, produce a gas that is within acceptable effluent limits associated with airbags. Also, the liquid desirably is non-corrosive to facilitate storage in a simple chamber. Any liquid that will meet these criteria can be used as the liquid 144. An example of a liquid that meets such criteria includes water mixed with $CaCl_2$.

The inflator 100 of FIG. 1 also includes gas flow openings 156 in the housing 108. As will be explained herein, when the inflator 100 is deployed, gas may flow out of the gas flow openings 156 so that it may be channeled into the airbag (not shown). The gas flow openings 156 may or may not be sealed by burst disks prior to deployment.

Figure 2:
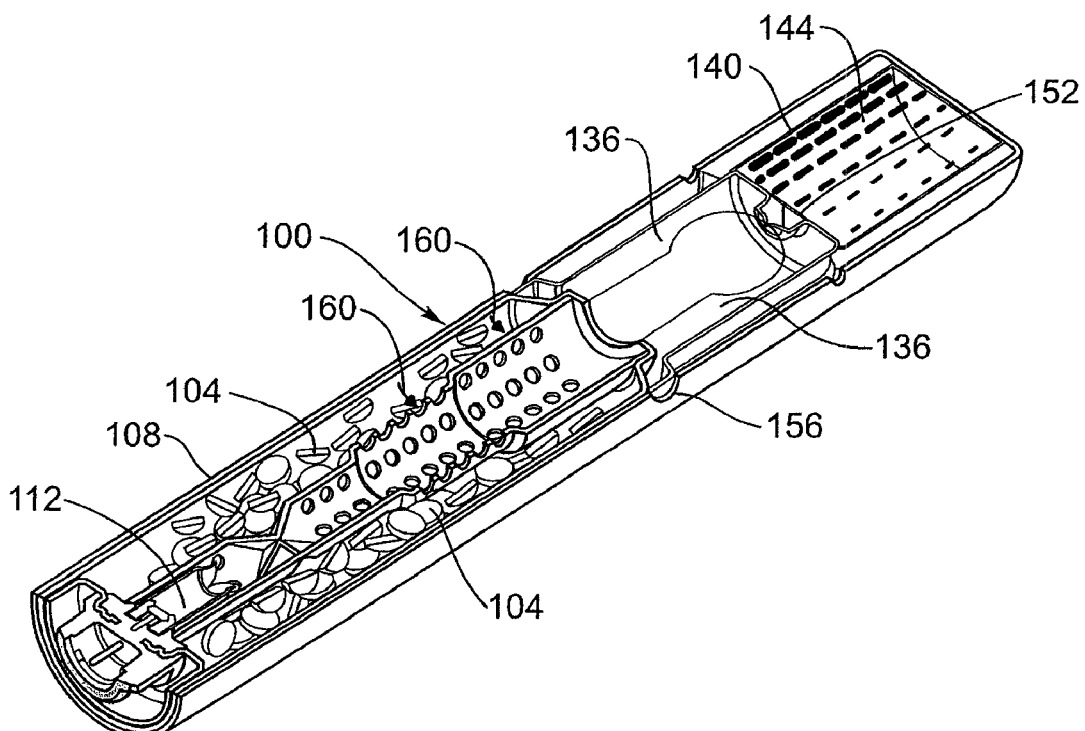
FIG. 2 is a sectional view of the embodiment of FIG. 1, the inflator being shown as the initiator is being actuated and the burst disk ruptures.

As noted above, FIG. 1 shows the inflator 100 prior to deployment. With reference to FIGS. 1 through 6, the deployment of the inflator 100 will now be described. FIG. 2 is a sectional view of the embodiment of FIG. 1 which shows actuation of the initiator 112. When the initiator 112 is actuated, hot gas is produced and allowed to pass through the holes 128, thereby contacting the gas generant 104. Such contact with the gas generant 104 ignites and combusts the gas generant 104 into a quantity of inflation gas.

Figure 3:
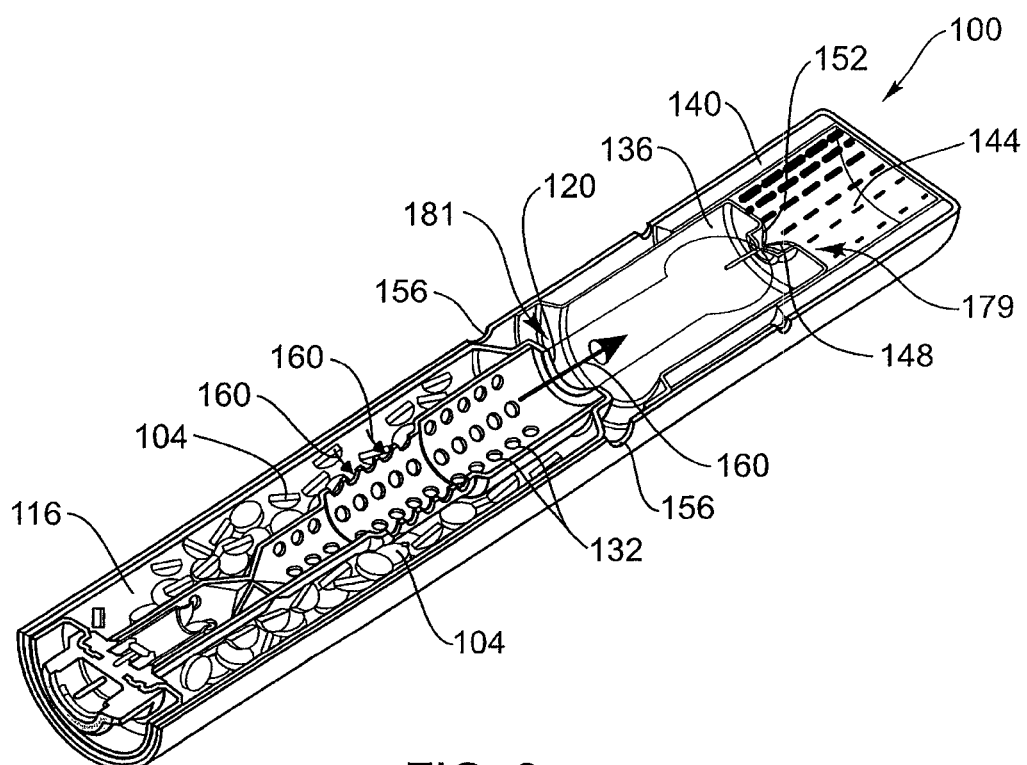
FIG. 3 is a sectional view of the embodiment of FIG. 1, the inflator being shown as the liquid injection is occurring.

FIG. 3 shows the inflator 100 as the gas generant 104 is combusted. As described above, the combustion of the gas generant 104 produces inflation gas 160 (represented graphically by arrows) that flows through the holes 132 in the diffuser 124 and contacts the burst disk 120. The production of the gas 160 pressurizes the chamber 116 and causes the burst disk 120 to rupture. Once ruptured, the gas 160 exits the chamber 116 and enters the chamber 140.

When the gas 160 is in the chamber 140, it contacts the piston 136 and pressurizes the interior of the chamber 140. Some of the gas 160 may also begin to exit the inflator 100 via the openings 156. However, the pressurization of the chamber 140 leads to rupturing of the burst disk 152 (shown in FIG. 1). Once ruptured, the liquid 144 begins to be injected through the opening 148 (which is no longer sealed by the disk 152) and mixes with the gas 160.

As shown in FIG. 3, the inflator 100 has an impact area 179 which is the area of the piston 136 that contacts the liquid 144. The inflator 100 also has a drive area 181, which is the area of the piston 136 that the gas 160 contacts. The impact area 179 is smaller than the drive area 181. The pressure of the liquid 144 is amplified due to the differences in areas 181 and 179. The liquid pressure is approximately equal to the pressure of the gas 160 times the ratio of the drive area 181 to the impact area 179. This pressure differential causes the liquid 144 to inject into the inside region of the piston 136 and thereby interact with the gas 160.

Figure 4:
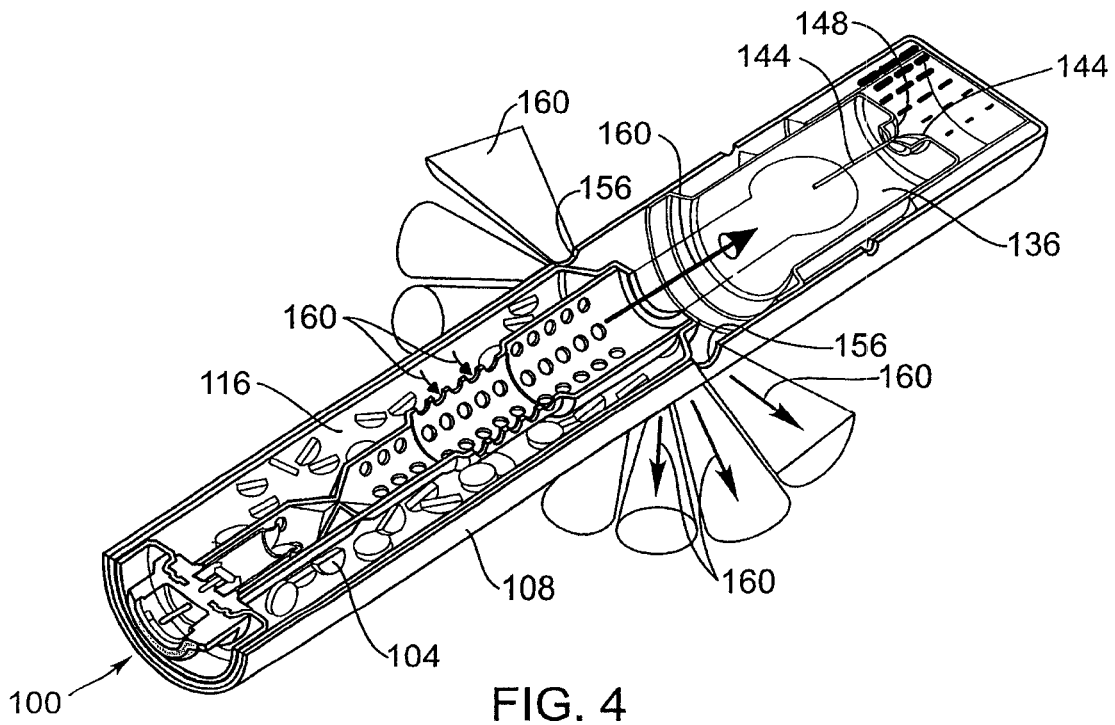
FIG. 4 is a sectional view of the embodiment of FIG. 1; the inflator being shown as the gas escapes the inflator.

FIG. 4 shows the deployment of the inflator 100 as the liquid 144 is being injected through the opening 148 and mixed with the gas 160. The pressure within the chamber 140 pushes against the piston 136 and causes the piston to move towards the liquid 144. This hydraulic pressure on the liquid 144 forces more of the liquid 144 through the opening 148. It will be appreciated that while this is occurring, gas 160 continues to enter the chamber 140 from the chamber 116. Some of the gas also continues to exit via the openings 156.

It should be noted that when the liquid 144 contacts the gas 160, at least some of the liquid 144 is vaporized into a gas stream. Obviously, this vaporization process operates to cool the gas 160. (Specifically, the heat required to vaporize or decompose the liquid 144 is removed from the gas stream and such heat removal serves to significantly cool the exiting gas 160). While filters have been used to cool combustion-produced inflation gas, through the use of the liquid 144, the gas 160 of a subject inflator device may be cooled without the use of an expensive filter. Further, vaporization of the liquid 144 increases the amount of gas within the chamber 140. Thus, by using the liquid 144, the amount of gas generant 104 necessary to produce sufficient inflation gas is reduced, further reducing the size and cost of the inflator 100.

Figure 5:
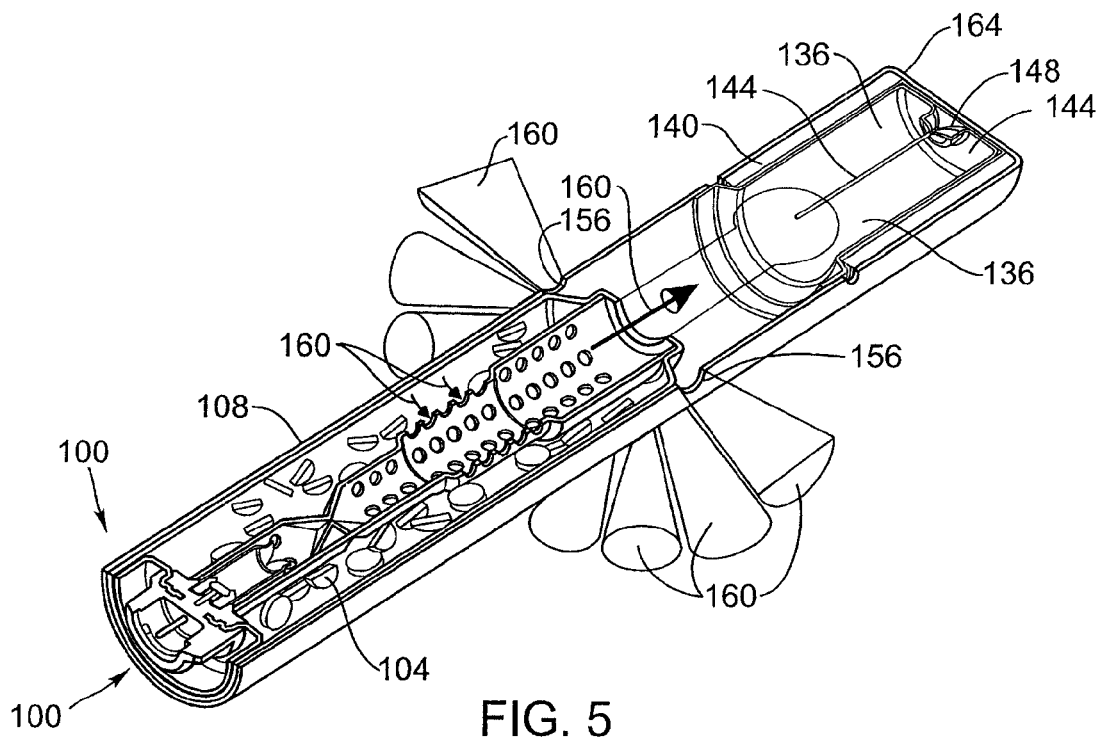
FIG. 5 is a sectional view of the embodiment of FIG. 1, the inflator being shown near the completion of the liquid injection.

FIG. 5 shows the inflator 100 after the piston 136 has completely moved. Specifically, the piston 136 has moved to the distal end 164 of the chamber 140, thereby forcing all of the liquid 144 to pass through the opening 148. Again, as noted above, this liquid 144 is vaporized into a gas. However, even after the liquid 144 has been fully injected, gas 160 is still exiting the inflator 100 via the openings 156.

Figure 6:
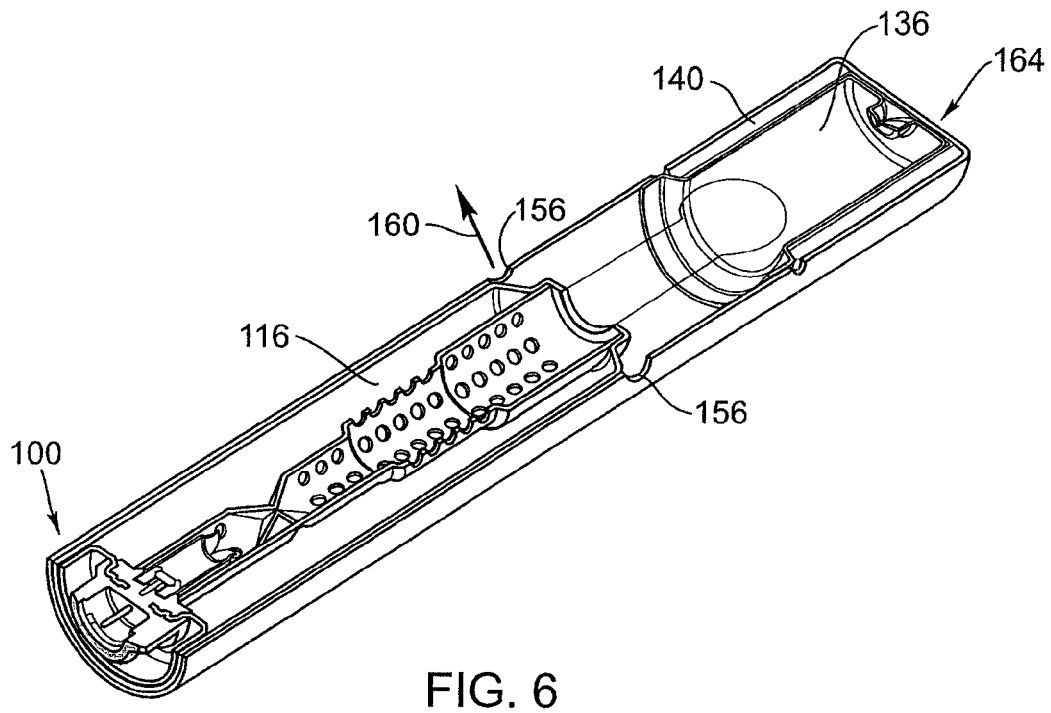
FIG. 6 is a sectional view of the embodiment of FIG. 1, the inflator being shown after the inflator has been fully deployed.

FIG. 6 shows the inflator 100 after the deployment process is complete. The liquid 144 has been fully converted into gas and has been emptied out of the chamber 140. The gas 160 produced by ignition of the gas generant 104 has also been fully discharged.

In one particular aspect of the invention, it has been found advantageous that the liquid 144 include as an additive at least one of a fuel soluble in the liquid or an oxidizer soluble in the liquid. When the liquid 144 is injected through the opening 148 and mixed with the gas 160, the at least one of a fuel and an oxidizer desirably decomposes, combusts and/or otherwise reacts to form additional gaseous products.

For example, in the case of an inflator 100 containing a fuel-rich gas generant, it can be advantageous to include a soluble oxidizer in the liquid such that such oxidizer is available for reaction with residual fuel material such as to result in more complete reaction of available reactant and increased gas production. Correspondingly, in the event of an inflator containing a fuel-deficient gas generant, it can be advantageous to include a soluble fuel in the liquid such that such fuel is available for reaction with residual oxidizer material such as to result in more complete reaction of available reactant and increased gas production.

As will be appreciated by those skilled in the art and guided by the teachings herein provided, various soluble fuels and soluble oxidizers can be used in the practice of the invention. For example and dependent on the specifics of a particular application, suitable soluble fuels and soluble oxidizers such as for inclusion when the liquid comprises water include fuel materials such as urea, guanidine nitrate, alcohols including glycols such as propylene glycol and diethylene glycol, for example, glycerin, other sugars, glycine, chromates and dichromates such as sodium chromate, for example, and carbonates such as magnesium carbonate, for example, formamide, oxalic acid, and ammonium oxalate, for example as well as oxidizer materials such as ammonium nitrate, methylammonium nitrate, and ammonium perchlorate, for example.

Moreover, it is to be understood that suitable additive materials can in various embodiments serve multiple, additional or different functions. For example, in some embodiments, a suitable fuel can be or also desirably serve as a thickening agent or gelling agent. Examples of fuel materials that can serve as thickening or gelling agents include gums such as guar gum, xanthan gum or the like and celluloses such as hydroxypropyl cellulose (HPC), for example. Further, the inclusion of additives such as alcohols and sugars can desirably serve as freeze point depressants or anti-freeze materials. Similarly, carbonates and chromates, including dichromates, can also desirably serve as corrosion inhibitors or anti-corrosion materials, for example.

A liquid preferred for use in accordance with one embodiment of the invention is desirably composed of a mixture that suitably comprises, consist essentially of or consists of water, $CaCl_2$ and propylene glycol (1,2-propanediol). Those skilled in the art and guided by the teachings herein provided will appreciate that such mixtures can contain components such as $CaCl_2$ and propylene glycol in various relative amounts dependent on the particular requirements of a specific application. For example, while the inclusion of $CaCl_2$ can significantly reduce the freezing point of the mixture, the $CaCl_2$ will typically not react, e.g., is inert, and thus adds to the inflator residue and increases the burden for filtering the inflation gas. Also, while propylene glycol can serve as a fuel and thus through its inclusion serve to increase the gas output from the inflator without detrimentally adding to the inflator residue, various undesirable products of combustion may form if propylene glycol is included in the mixture in too high a relative amount. In view of the above, mixture of water with 10-20% $CaCl_2$ and 3-10% propylene glycol is desirable in some preferred embodiments, with a mixture of water with 15% $CaCl_2$ and 5% propylene glycol being particularly preferred for some embodiments.

Those skilled in the art and guided by the teachings herein or sided with further appreciate, that in accordance with selected embodiments suitable liquids may include additional or alternative inert materials to $CaCl_2$. For example, a suitable liquid may include laponite, such as may serve as a thickener for the liquid.

In one preferred embodiment, the liquid 144 includes as additives both at least one soluble fuel and at least one soluble oxidizer, with the at least one soluble fuel and the at least one soluble oxidizer reactable upon actuation to form additional gas. More specifically, when the liquid 144 is injected through the opening 148 and mixed with the gas 160, the at least one soluble fuel and the at least one soluble oxidizer desirably decompose, combust and/or otherwise react such as to form additional gaseous products.

Those skilled in the art and guided by the teachings herein provided will appreciate that various advantageous and/or benefits are attainable or can be realized through such addition of fuel and/or oxidizer in the liquid. For example, through the increased or added gas product production resulting via such addition, the gas generant load required for an inflator to produce a particular gas output can be reduced and thus one or more of the cost, size and weight of gas generant and the associated inflator can be reduced. Further, such addition of fuel and/or oxidizer in the liquid can be accomplished via a very simple process. Still further, the addition of the fuel and/or oxidizer can further serve to depress the freezing point of the liquid such as to reduce, minimize, or avoid the need to include a supplemental antifreeze material or additive in the liquid.

Figure 7:
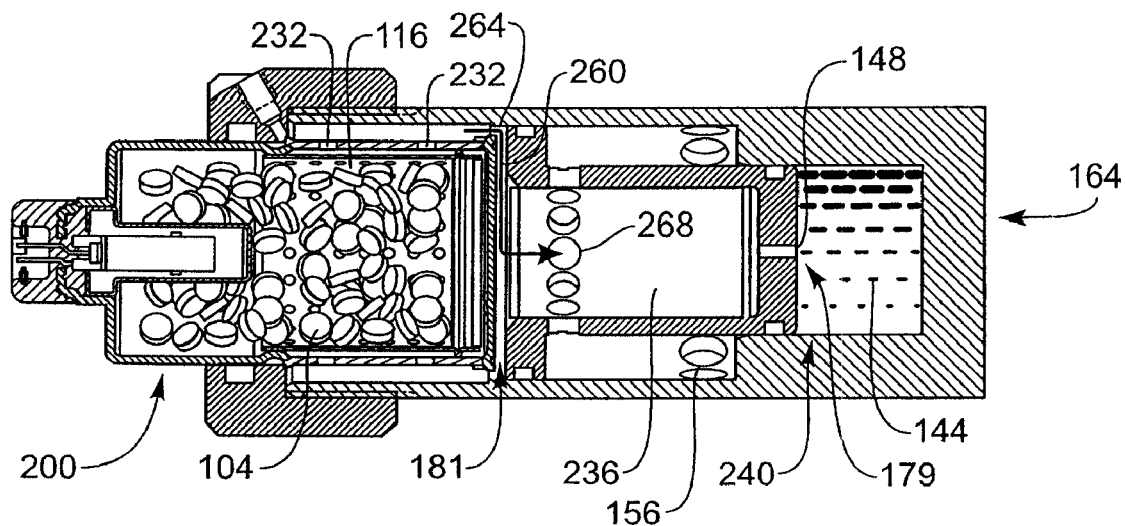
FIG. 7 is a sectional view of another embodiment of an inflator.

FIG. 7 is a sectional view of another embodiment of an inflator, here designated by the reference numeral 200. The inflator 200 is similar to the embodiment shown in FIG. 1 and described above. For purposes of brevity, that discussion will not be repeated.

The main difference between the inflator 200 and the inflator 100 is that the inflator 200 does not include a diffuser 124. Rather, the inflator 200 simply has openings 232 that the gas 260 will pass through after it has been formed from ignition of the gas generant 104. When the gas 260 passes through the openings 232, it will flow, as indicated by the arrows, through a tortuous path. More specifically, the gas 260 will flow past the corner 264 such that the gas flow path will bend. When the gas flow bends in this manner, entrained particulates and other solids such as may be found within the gas 260 will separate from the gas 260 and deposit proximate the corner 264. Thus, such entrained particulates are removed from the gas 260 flow without the inclusion and use of an expensive filter or diffuser.

As shown in FIG. 7, a piston 236 is used in the inflator 200. The piston 236 is hollow and is within a chamber 240.

Accordingly, the gas 260 leaving the chamber 116 will flow into the interior of the piston 236. The piston 236 includes exit openings 268 that allow the gas to flow to the exterior of the piston 236 and then exit the inflator 200 via openings 156. The piston 236 also includes an opening 148 that may or may not be sealed by a burst disk 152. Again, the pressure caused by the gas serves to move the piston 236 towards the distal end 164 and will inject the liquid 144 through the opening 148. Once injected, the liquid 144 vaporizes and cools the gas 260 in the manner described above. During deployment of the inflator 200, the piston 236 may be fully displaced so that all of the liquid 144 may be fully forced through the opening 148.

As shown in FIG. 7, the inflator 200 has an impact area 179 which is the area of the piston 136 that contacts the liquid 144. The inflator 200 also has a drive area 181, which is the area of the piston 136 that the gas 160 contacts. The impact area 179 is smaller than the drive area 181.

As with the inflator 100 shown in FIG. 1 and described above, the liquid 144 of the inflator 200 may include at least one of a fuel soluble in the liquid or an oxidizer soluble in the liquid. When the liquid 144 is injected through the opening 148 and mixed with the gas 260, the at least one of a fuel or an oxidizer desirably decomposes, combusts and/or otherwise reacts to form additional gaseous products. In one preferred embodiment, the liquid 144 includes at least one soluble fuel and at least one soluble oxidizer, with the at least one soluble fuel and the at least one soluble oxidizer reactable upon actuation to form additional gas.

Figure 8:
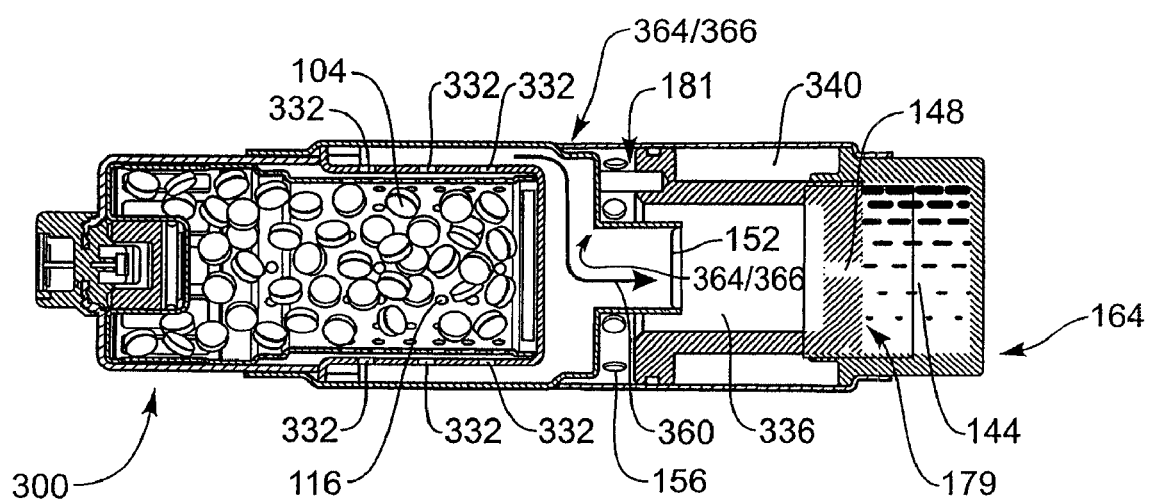
FIG. 8 is a sectional view of another embodiment of an inflator.

Referring now to FIG. 8, a sectional view of an inflator 300 is illustrated. The inflator 300 is similar to the embodiments discussed above. For purposes of brevity, that discussion will not be repeated.

Like the embodiment shown above, the inflator 300 does not include a diffuser. Rather, the inflator 300 includes openings 332 through which the gas 360 (produced by ignition of the generant 104) can exit the chamber 116. As with the embodiment discussed above, the gas 360, upon exiting the chamber 116, engages in a tortuous path, passing two or more corners 364. Such corners 364 are right angle turns that serve to receive entrained particulates. In other words, when the gas 360 turns at the corner 364, entrained particulates will separate out of the gas and deposit at a capture area 366. Generally, this capture area 366 is a corner or uneven surface that facilitates deposition. Thus, the entrained particulates are removed from the gas 360 without the use of an expensive filter or diffuser.

The inflator 300 also includes a piston 336. The piston 336 is hollow and is within a chamber 340. Accordingly, the gas 360 leaving the chamber 116 will flow into the interior of the piston 336. The inflator 300 also includes openings that will allow the gas to flow to the exterior of the piston 336 and then exit the inflator 300 via openings 156. The piston 336 also includes an opening 148 that may or may not be sealed by a burst disk 152. Again, the pressure caused by the gas will move the piston 336 towards the distal end 164 and will inject the liquid 144 through the opening 148. Once injected, the liquid 144 will vaporize and cool the gas 360 in the manner described above. During deployment of the inflator 300, the piston 336 may be fully displaced so that all of the liquid 144 may be fully forced through the opening 148. The inflator 300 has an impact area 179 and a drive area 181. The impact area 179 is smaller than the drive area 181.

Similar to the inflator 100 shown in FIG. 1 and described above, the liquid 144 of the inflator 300 may include at least one of a fuel soluble in the liquid or an oxidizer soluble in the liquid. When the liquid 144 is injected through the opening 148 and mixed with the gas 360, the at least one of a fuel or an oxidizer desirably decomposes, combusts and/or otherwise reacts to form additional gaseous products. In one preferred embodiment, the liquid 144 includes at least one soluble fuel and at least one soluble oxidizer, with the at least one soluble fuel and the at least one soluble oxidizer reactable upon actuation to form additional gas.

Figure 9:
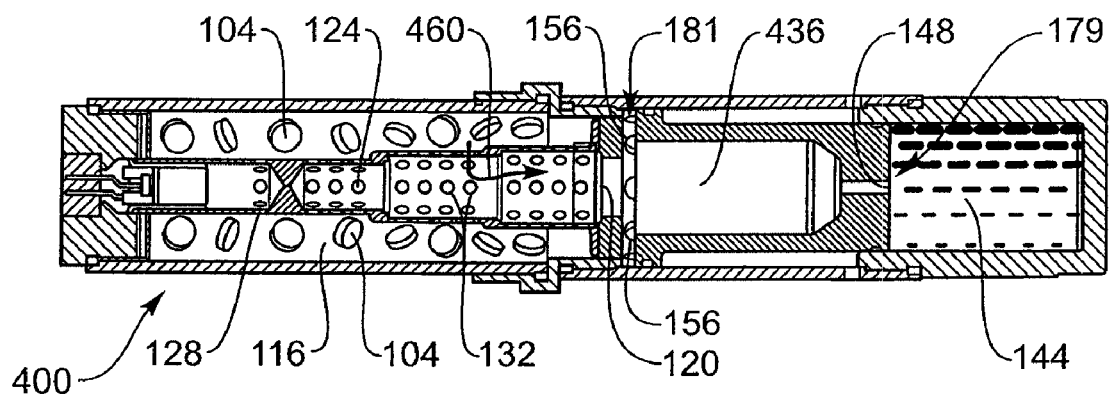
FIG. 9 is a sectional view of another embodiment of an inflator.

Referring now to FIG. 9, another embodiment of an inflator 400 is illustrated. The inflator 400 is similar to the embodiments discussed above. For purposes of brevity, this discussion will not be repeated.

As with the embodiment of FIG. 1, the inflator 400 includes a diffuser 124. As described above, gas 460 produced by the ignition of the generant 104 will flow through the holes 132 and rupture the burst disk 120 and then exit the chamber 116. Upon exiting the chamber 116, the gas will be allowed to exit the inflator 400 via the openings 156. The gas will also access the interior of the piston 436 and may move the piston 436, thereby forcing the liquid 144 through the opening 148 in the manner described above. The inflator 400 has an impact area 179 and a drive area 181. The impact area 179 is smaller than the drive area 181.

Figure 10:
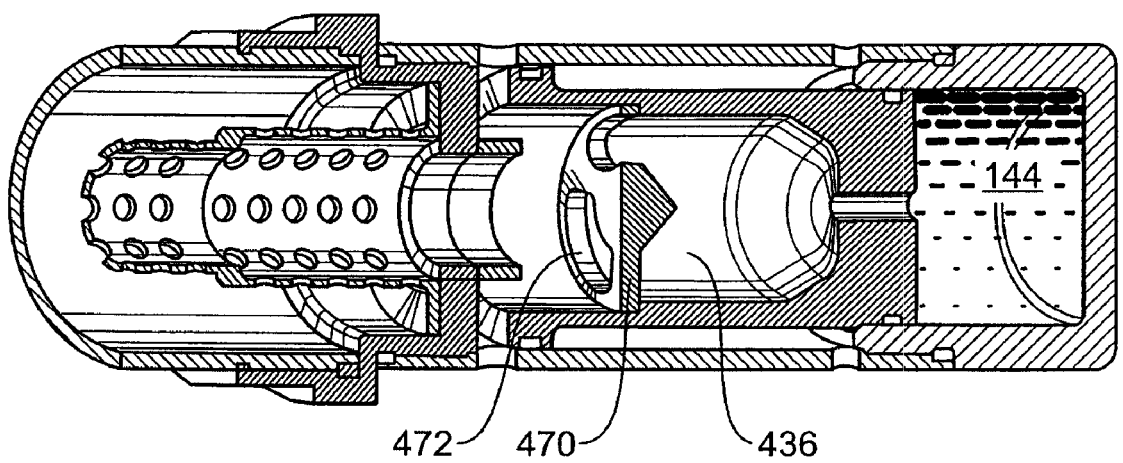
FIG. 10 is a sectional view showing a baffle that may be used as part of the embodiment of FIG. 9.

FIG. 10 is a cutaway view of the embodiment of FIG. 9. As shown in FIG. 10, the inflator 400 may further include one or more baffles 470 that operate to guide/direct the gas 460 and the injected liquid 144. Those skilled in the art will appreciate that other configurations and/or shapes for the baffles 470 are also possible. In fact, the baffles 470 may be shaped, as necessary, to adjust the gas flow. The baffles 470 may have additional openings 472. It should be noted that in some embodiments, the direction of the gas leaving the gas generant chamber 116 is directly opposite (or substantially opposite) to the direction of the liquid 144 being injected. As a result, these two streams can push against each other and hinder proper flow. In some instances, the entrained particulates may accumulate and clog the opening 148 (FIG. 9), thereby preventing the liquid 144 from cooling the gas 460. Accordingly, the baffles 470 may be added to direct the gas flow so that it is not flowing in a direction that frustrates or prevents the flow of the liquid 144.

As with the inflator 100 shown in FIG. 1 and described above, the liquid 144 of the inflator 400 may include at least one of a fuel soluble in the liquid or an oxidizer soluble in the liquid. When the liquid 144 is injected through the opening 148 and mixed with the gas 460, the at least one of a fuel or an oxidizer desirably decomposes, combusts and/or otherwise reacts to form additional gaseous products. In one preferred embodiment, the liquid 144 includes at least one soluble fuel and at least one soluble oxidizer, with the at least one soluble fuel and the at least one soluble oxidizer reactable upon actuation to form additional gas.

Figure 11:
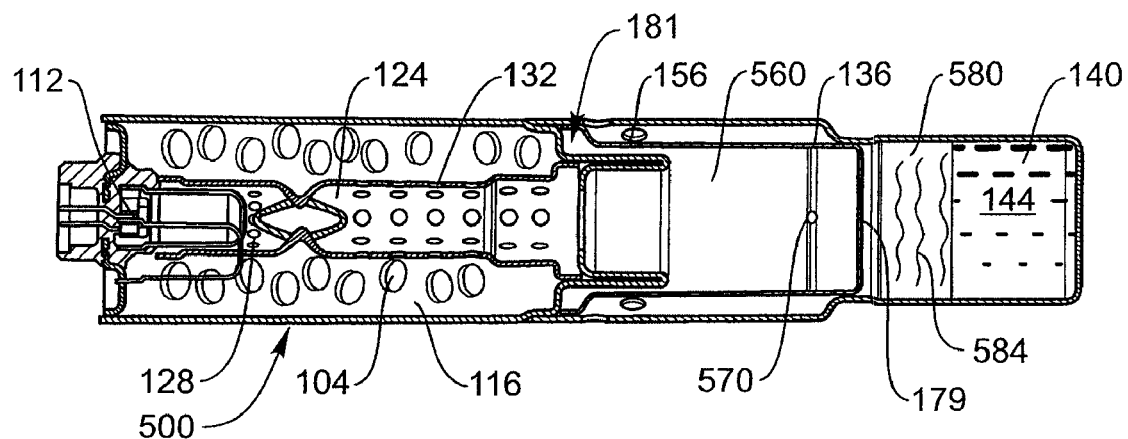
FIG. 11 is a sectional view of another embodiment of an inflator.
Figure 11A:
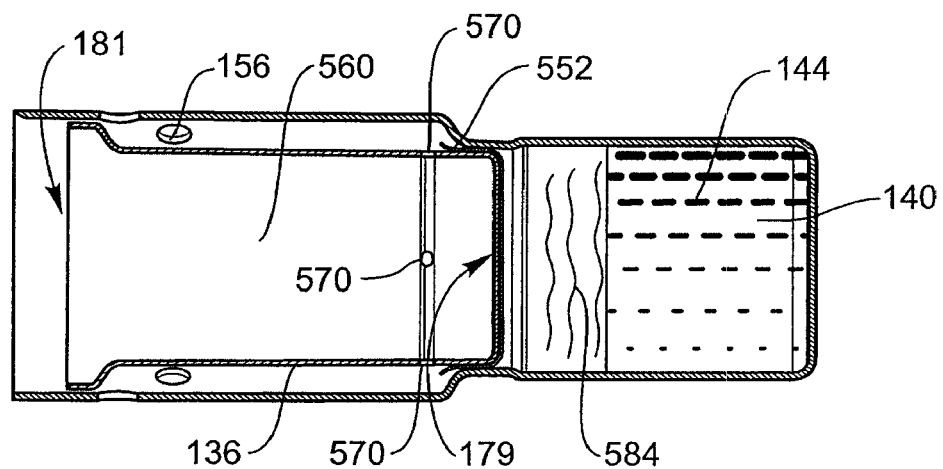
FIG. 11A is an enlarged version of the piston shown in FIG. 11.

FIG. 11 is a sectional view of another embodiment of an inflator 500 according to the present embodiments. FIG. 11A is an enlarged version of the piston portion of FIG. 11. Referring now to FIGS. 11 and 11A, the inflator 500 includes generant 104 housed within a chamber 116. As with the previous embodiments, an initiator 112 is capable of igniting the gas generant 104 into a quantity of inflation gas. A diffuser 124 is positioned within the chamber 116. The diffuser 124 includes holes 132 that will allow the gas produced by combustion of the generant 104 access to the interior of the diffuser 124 and can escape the chamber 116.

The inflator 500 will further comprise a piston 136. Adjacent the piston 136 is a chamber 140 that includes a liquid 144. As shown in FIG. 11A, the liquid 144 is sealed within the chamber 140 with a seal 552. This seal 552 may be a cup that is press fit around the piston 136 to seal the chamber 140. In other embodiments, the seal 552 may be a coating that is added to the piston 136 (or the chamber 140) to seal the chamber 140. Those skilled in the art will appreciate how to seal the chamber 140 via the seal 552. It should be noted that the inflator 500, unlike some of the prior embodiments, does not have a burst disk. Rather, this embodiment has a seal 552 that is used to seal the chamber 140.

The interior of the piston 136 is or forms a mixing chamber 560. When gas produced by the combustion of the generant 104 exits the chamber 116, it may impact the piston 136 and fill the mixing chamber 560. As the piston 136 advances into chamber 140, the gas produced can exit the inflator via openings 156. The piston 136 has an impact area 179 and a drive area 181. The impact area 179 is smaller than the drive area 181.

Figure 12:
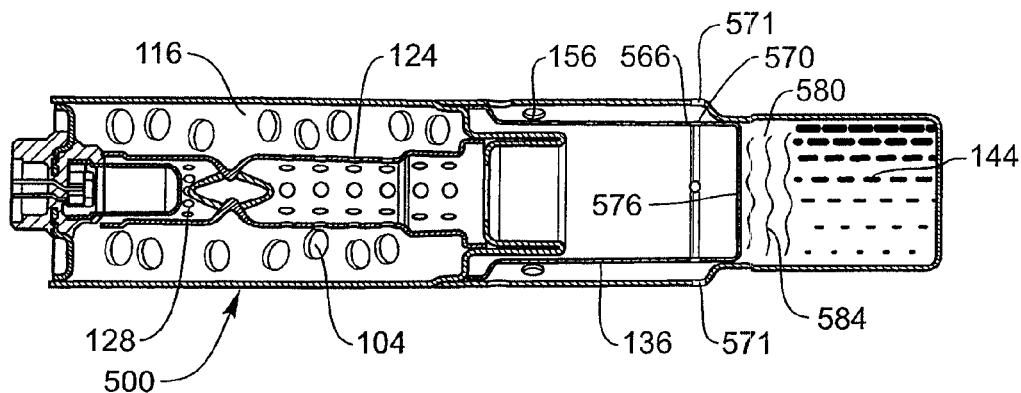
FIGS. 12 through 14 are sectional views that show the stages of deployment of the inflator of FIG. 11.
Figure 13:
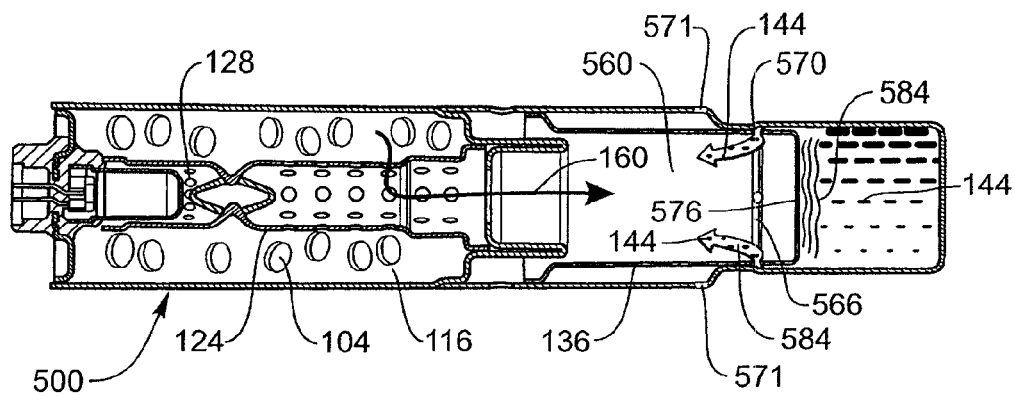
Figure 14:
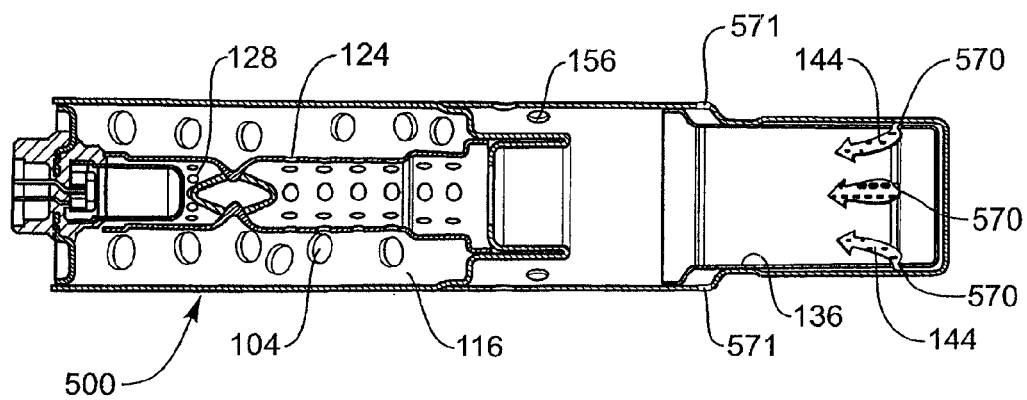

Referring now to FIGS. 12, 13, and 14, the stages of deployment of the inflator 500 are illustrated. When the generant 104 is combusted, a quantity of gas is produced. (This gas is illustrated by the arrow 160). This gas exits the chamber 116 via the diffuser 124 and may contact the piston 136. Some of this gas 160 may also begin to exit the inflator 500 via the openings 156. As the gas contacts the piston 136, the piston begins to move/displace towards the chamber 140. In turn, this displacement unseals the seal 552. For example, the press fit seal 552 is displaced such that it is no longer capable of sealing. (This may be that the piston 136 displaces past a press fit zone, i.e., an area that is press fit so that there is no longer a seal). In some embodiments, the piston 136 may have a depression 566 or other feature that, when moved towards the chamber 140, operates to ensure that there is a passage through which liquid 144 may flow. One or more vent holes 571 may also be added. These vent holes may operate to relieve pressure (such as "back pressure") in the device.

Once the seal 552 has been unsealed, liquid 144 will begin to flow out of the chamber 140. This liquid 144 may flow through openings 570 in the piston 136. Again, the movement of the piston 136 hydraulically expels the liquid 144 in the chamber 140 thereby causing the liquid 144 to inject through opening 570 for contact and mixing with the gas 160. (FIG. 13 shows the piston 136 as it is being moved, whereas FIG. 14 shows the piston 136 after it has been fully displaced and the liquid 144 has been fully expelled out of the chamber 140). The liquid 144 injected into the interior of the piston 136 is vaporized and used to inflate the airbag. However, the vaporization operates to cool the gas, as described herein. The gas 160 and the liquid 144 may mix in the mixing chamber 560. It should be noted that, in some embodiments, the gas 160 will push against the piston head 576 of piston 136 as a means of moving the piston 136. As the gas 160 pushes against this piston head 576, particulates and other undesirable byproducts can be deposited onto the piston head 576 and are thus separated from the quantity of gas 160.

Further, as noted above, the piston 136 may displace towards the chamber 140. In some embodiments, this movement of the piston 136 may be facilitated by not having the chamber 140 completely full with liquid 144. In other words, there is a space (sometimes called a "head space") within the chamber 140 into which the piston 136 may displace. In some embodiments, this head space 580 may be filled with a compressible gas 584 that allows the piston 136 to move into the chamber 140 during deployment. This compressible gas 584 may be air, argon, or any other suitable gas. This gas will escape out of the chamber 140 when it is unsealed and may further be used in the inflation process.

As with the inflator embodiments described above, the liquid 144 of the inflator 500 may include at least one of a fuel soluble in the liquid or an oxidizer soluble in the liquid. When the liquid 144 is injected through the opening 570 and mixed with the gas 160, the at least one of a fuel or an oxidizer desirably decomposes, combusts and/or otherwise reacts to form additional gaseous products. In one preferred embodiment, the liquid 144 includes at least one soluble fuel and at least one soluble oxidizer, with the at least one soluble fuel and the at least one soluble oxidizer reactable upon actuation to form additional gas.

Figure 15:
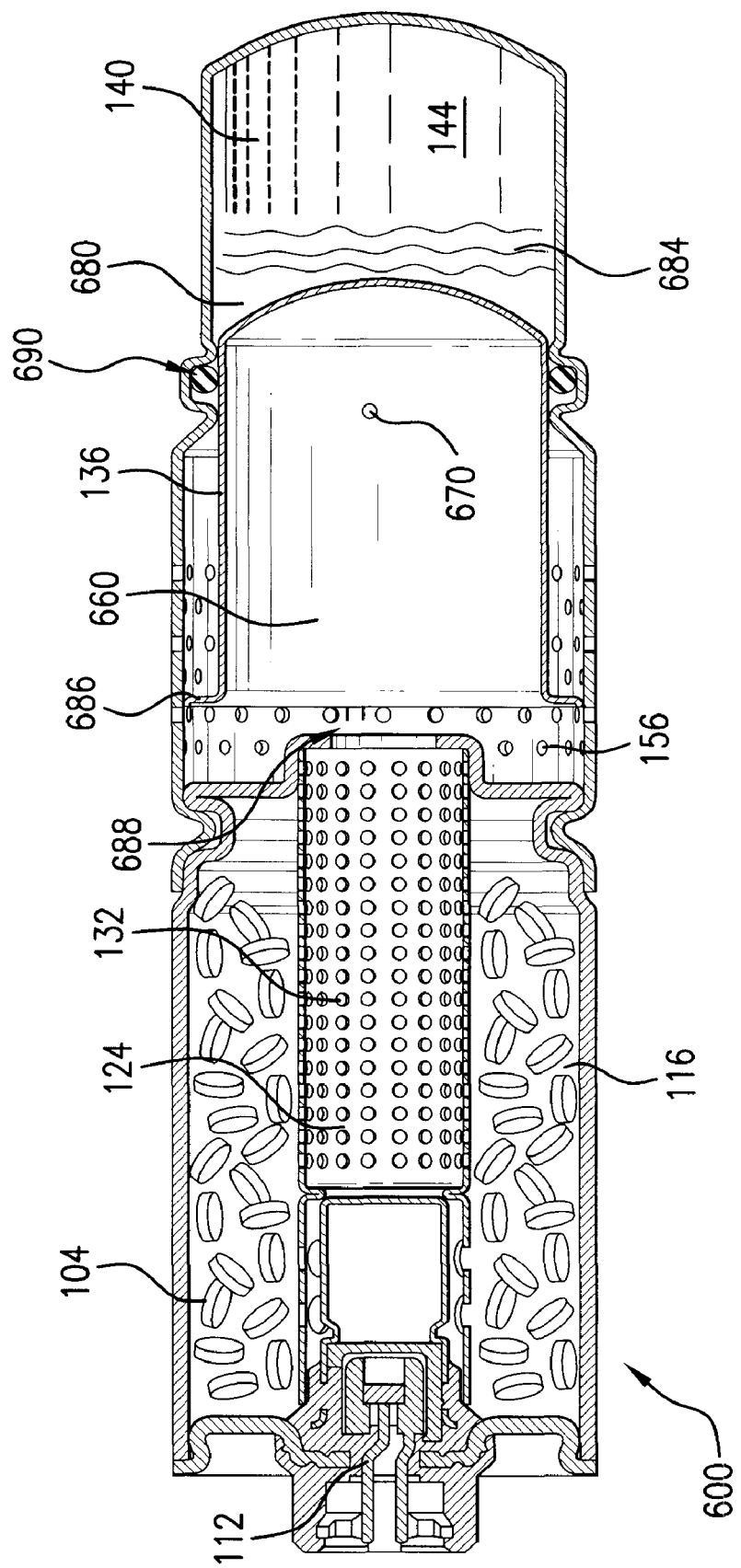
FIG. 15 is a sectional view of another embodiment of an inflator.

Turning now to FIG. 15, there is illustrated an inflator 600 in accordance with another embodiment. The inflator 600 includes gas generant 104 housed within a chamber 116. As with the previous embodiments, an initiator 112 is capable of igniting the gas generant 104 into a quantity of inflation gas. A diffuser 124 is positioned within the chamber 116. The diffuser 124 includes holes 132 that will allow the gas produced by combustion of the gas generant 104 access to the interior of the diffuser 124 and can escape the chamber 116.

The inflator 600 further comprises a piston 136. The piston 136 includes a base flange 686. In the illustrated embodiment, the piston 136 of the inflator 600 is desirably held in place, until deployment, by means of tabs 688 such as formed from the outer housing 100 by piercing the outer housing and folding such piercing inward towards the interior of the housing and such as included at several locations (e.g., typically 4 to 6 locations) above (not shown) and below the piston base flange 686. As will be appreciated by those skilled in the art and guided by the teachings herein provided, if desired, suitable alternative elements or means to maintain the placement of the piston 136 within the housing 100 until deployment can be employed in the practice of the invention.

Adjacent the piston 136 is a chamber 140 that includes or contains liquid 144. In this embodiment, rather than a press fit with a sealing member sandwiched between the piston and the chamber to seal the liquid, the liquid 144 is sealed within the chamber 140 via the inclusion of an O-ring seal 690.

As with the above described embodiment, the interior of the piston 136 is or forms a mixing chamber 660. When gas produced by the combustion of the generant 104 exits the chamber 116, it may impact the piston 136 and fill the mixing chamber 660. As the piston 136 advances into chamber 140, the gas produced can exit the inflator via openings 156.

When the generant 104 is combusted, a quantity of gas is produced. This gas exits the chamber 116 via the diffuser 124 and may contact the piston 136. Some of this gas may also begin to exit the inflator 600 via the openings 156. As this gas contacts the piston 136, the piston begins to move/displace towards the chamber 140.

Once one or more of the openings 670 have been moved/displaced into the chamber 140, past the O-ring seal 690, liquid 144 will begin to flow out of the chamber 140 through the openings 670 in the piston 136. Again, the movement of the piston 136 hydraulically expels the liquid 144 in the chamber 140 thereby causing the liquid 144 to inject through the openings 670 for contact and mixing with the gas generant combustion product gas. The liquid 144 injected into the interior of the piston 136 is vaporized and used to inflate the airbag. However, the vaporization operates to cool the gas generant combustion product gas, as described herein. The gas generant combustion product gas and the liquid 144 may mix in the mixing chamber 660. It should be noted that, in some embodiments, the gas generant combustion product gas will push against the head of the piston 136 as a means of moving the piston 136. As the gas generant combustion product gas pushes against the piston head, particulates and other undesirable byproducts can be deposited onto the piston head and are thus separated from the quantity of gas generant combustion product gas.

Further, as noted above, the piston 136 may displace towards the chamber 140. In some embodiments, this movement of the piston 136 may be facilitated by not having the chamber 140 completely full with liquid 144. In other words, there is a space (sometimes called a "head space") within the chamber 140 into which the piston 136 may displace. In some embodiments, this head space 680 may be filled with a compressible gas 684 that allows the piston 136 to move into the chamber 140 during deployment. This compressible gas 684 may be air, argon, or any other suitable gas. This gas will escape out of the chamber 140 when it is unsealed and may further be used in the inflation process.

Similar to other inflator embodiments described above, the liquid 144 of the inflator 600 may include as an additive at least one of a fuel soluble in the liquid or an oxidizer soluble in the liquid. When the liquid 144 is injected through the openings 670 and mixed with the gas generant combustion product gas, the at least one of a fuel or an oxidizer desirably decomposes, combusts and/or otherwise reacts to form additional gaseous products. In one preferred embodiment, the liquid 144 includes as additives at least one soluble fuel and at least one soluble oxidizer, with the at least one soluble fuel and the at least one soluble oxidizer reactable upon actuation to form additional gas.

Referring now to all of the Figures generally, it will be appreciated that the present embodiments provide various advantages. For example, the present embodiments do not require the use of a filter to cool the gas. Rather, the cooling function is replaced by the injection of the liquid 144 into the gas stream during deployment. The particulate removal function of the filter is accomplished by turning the gas flow significantly prior to exiting the inflator. The gas produced by vaporization or decomposition of the liquid contributes to the airbag inflation. The pressure required to inject the liquid into the gas stream may be provided by the combustion pressure of the inflator. Further, in some embodiments, the rate of liquid injection may be proportional to the combustion pressure of the inflator, so the liquid may inject faster at hot temperatures (higher combustion pressures) and slower at cooler temperatures (lower combustion pressures).

Still further, as will be appreciated by those skilled in the art and guided by the teachings herein provided, through the addition or inclusion of a soluble fuel and/or soluble oxidizer in the liquid, such as in accord with embodiments described herein, various advantageous and/or benefits can be attained or realized. For example, through the relatively simple addition or inclusion of a relatively inexpensive soluble fuel and/or soluble oxidizer to the liquid coolant, a significant increase in gas product yield can be realized with a minimal inflator volume change. Moreover, the increased or added gas product production resulting via such addition allows a significant reduction in the load of required gas generant as well as a significant reduction in the combustion chamber size. In effect, such addition or inclusion of a soluble fuel and/or soluble oxidizer in part exchanges simple liquid solution for more costly gas generant.

The present invention may be embodied in other specific forms without departing from its structures, methods, or other essential characteristics as broadly described herein and claimed hereinafter. Moreover, the invention illustratively disclosed herein suitably may be practiced in the absence of any element, part, step, component, or ingredient which is not specifically disclosed herein. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An inflator comprising:
   a housing at least in part defining a first chamber containing a quantity of gas generant;
   an initiator operatively associated with the first chamber and in reaction initiating communication with at least a portion of the quantity of gas generant, the initiator, upon actuation, to ignite at least a portion of the quantity of gas generant to form gas;
   the housing further at least in part defining a second chamber adjacently disposed to the first chamber, the second chamber containing a quantity of liquid and a piston assembly, the liquid includes at least one of a fuel soluble in the liquid or an oxidizer soluble in the liquid, the piston assembly including a piston having an interior sealed from the quantity of liquid, wherein during deployment, the piston moves to unseal the interior of the piston from the liquid to expel at least a portion of the quantity of liquid from the second chamber such that the expelled liquid contacts and cools gas formed by the ignition of the gas generant; and
   the housing further having at least one discharge opening to permit gas to exit the housing.

2. The inflator of claim 1 wherein the liquid comprises water.

3. The inflator of claim 1 wherein the first chamber has a constant volume.

4. The inflator of claim 1 wherein the gas generant is fuel-rich and the liquid includes at least one soluble oxidizer.

5. The inflator of claim 1 wherein the gas generant is fuel-deficient and the liquid includes at least one soluble fuel.

6. The inflator of claim 1 wherein the liquid includes at least one of the group consisting of urea, guanidine nitrate, alcohols, glycerin, other sugars, glycine, chromates, dichromates, carbonates, formamide, oxalic acid, and ammonium oxalate.

7. The inflator of claim 1 wherein the liquid includes at least one alcohol and the alcohol comprises at least one glycol selected from the group consisting of propylene glycol and diethylene glycol.

8. The inflator of claim 1 wherein the liquid includes at least one of the group consisting of ammonium nitrate, methylammonium nitrate, and ammonium perchlorate.

9. The inflator of claim 1 wherein the liquid comprises at least one fuel and the fuel comprises a thickening agent.

10. The inflator of claim 1 wherein the liquid includes at least one soluble fuel and the at least one soluble fuel is at least one of urea or guanidine nitrate.

11. The inflator of claim 1 wherein the liquid includes at least one soluble oxidizer and the at least one soluble oxidizer is ammonium nitrate.

12. The inflator of claim 1 wherein the liquid consists essentially of water, propylene glycol and $CaCl_2$.

13. The inflator of claim 1 wherein the liquid includes at least one soluble fuel and at least one soluble oxidizer, the at least one soluble fuel and the at least one soluble oxidizer reactable upon actuation to form additional gas.

14. An inflator comprising:
   a housing at least in part defining a first chamber containing a quantity of gas generant solid, the first chamber having a constant volume;
   an initiator operatively associated with the first chamber in reaction initiating communication with at least a portion of the quantity of gas generant solid, the initiator, upon actuation, to ignite the gas generant to form gas;

the housing additionally at least in part defining a second chamber adjacently disposed to the first chamber, the second chamber containing a quantity of liquid and a piston assembly, the liquid includes at least one soluble fuel and at least one soluble oxidizer that upon actuation are reactable to form additional gas, the piston assembly includes a piston having an interior sealed from the quantity of liquid, wherein during deployment, the piston moves to unseal the interior of the piston from the liquid to hydraulically expel at least a portion of the quantity of liquid from the second chamber such that the expelled liquid contacts, vaporizes, mixes with and cools gas formed by the ignition of the gas generant and at least a portion of the at least one soluble fuel and at least one soluble oxidizer react to form additional gas; and the housing further having at least one discharge opening to permit gas to exit the housing.

15. The inflator of claim 14 wherein the liquid comprises water.

16. The inflator of claim 14 wherein the at least one soluble fuel is at least one of urea and guanidine nitrate and the at least one soluble oxidizer is ammonium nitrate.

17. A method of cooling gas formed in an inflator, the inflator comprising a housing at least in part defining a first chamber containing a quantity of gas generant, an initiator, the housing further at least in part defining a second chamber adjacently disposed to the first chamber, the second chamber containing a quantity of liquid and a piston assembly, the liquid includes at least one of a fuel or an oxidizer soluble in the liquid, the method comprising:

igniting the gas generant to form gas;

unsealing an opening in the piston assembly that was used to seal the interior of the piston; and moving the piston to expel at least a portion of the quantity of liquid from the second chamber such that the expelled liquid contacts and cools gas formed by the ignition of the gas generant and the at least one of a fuel soluble in the liquid or an oxidizer soluble in the liquid reacts to form additional gas.

18. The method of claim 17 wherein the liquid comprises water.

19. The method of claim 17 wherein the gas generant is fuel-rich, the liquid includes at least one soluble oxidizer, and ignition of the gas generant results in residual fuel material, the method additionally comprising reacting at least a portion of the soluble oxidizer with at least a portion of the residual fuel material to form at least a portion of said additional gas.

20. The method of claim 17 wherein the gas generant is fuel-deficient, the liquid includes at least one soluble fuel, and ignition of the gas generant results in residual oxidizer material, the method additionally comprising reacting at least a portion of the soluble fuel with at least a portion of the residual oxidizer material to form at least a portion of said additional gas.

* * * * *